Oct. 18, 1949.    D. R. POWELL    2,485,312
ATTACHMENT FOR LAWN MOWERS
Filed Aug. 11, 1947

INVENTOR
David R. Powell
BY John Mahoney
ATTORNEY

Patented Oct. 18, 1949

2,485,312

UNITED STATES PATENT OFFICE 2,485,312

ATTACHMENT FOR LAWN MOWERS

David R. Powell, Euclid, Ohio

Application August 11, 1947, Serial No. 768,056

7 Claims. (Cl. 56—249)

My invention relates to attachments for lawn mowers and more particularly to an attachment for preventing the mower from tilting when one of the wheels of the mower extends beyond the edge of the lawn.

In mowing lawns in which a recessed walk or flower bed lies adjacent to an edge of the lawn, difficulty is encountered in mowing the edges of the lawn with commercial lawn mowers of the present type because when one of the wheels of the mower extends over an edge of the lawn and rides in the recess, the cutter digs into the lawn. It has accordingly been the practice to mow the lawn as close to the edge as practicable and then trim the edge with a hand tool, such as clippers. The use of clippers, however, entails considerable labor and while attempts have heretofore been made to provide attachments for lawn mowers which enable the mower to trim the edges of the lawn adjacent recessed walks or the like, they have either been difficult to adjust or have been complicated in design.

According to my invention, I have provided an attachment, for lawn mowers that is simple in structure, effective in operation, and which may be easily adjusted from its operative to its inoperative positions by women, boys, or unskilled workmen. My improved attachment may be secured to the tie rod of a lawn mower either when the tie rod extends between the frames at the front of the mower or when the tie rod is axial with the wheel hubs and the attachment is constructed in such a manner that it will not interfere with the operation of the cutter, irrespective of the position of the tie rod.

My invention will be better understood by reference to the accompanying drawings in which.

Figure 1:
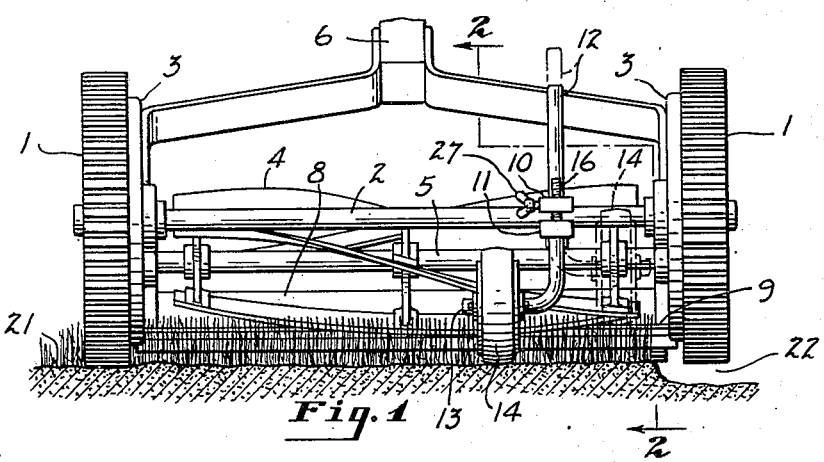
Fig. 1 is a front elevational view of a mower having its tie rod in alignment with the wheel hubs and a front view of my improved attachment with the roll shown in full lines in one position and in dotted lines in an alternate position.

While my improved attachment may be applied to lawn mowers of any desired type, a hand operated, side wheel driven type is shown in which the side wheels 1 are journalled on a tie rod or axle 2 secured to frames 3 and in which the wheels are provided with internal gears to drive the cutter 4 through pinions on the cutter shaft 5. The side frames 3 also carry the handle 6 and bearings 7 for the back roll 8, and attached to the bearings is the fixed blade 9 as in usual lawn mower construction.

According to my invention, I have provided an improved attachment for lawn mowers comprising a pair of superimposed clamping bars 10 and 11 by means of which my improved device may be secured to the tie rod adjacent one wheel and a supporting rod 12 having its lower portion bent at right angles to the main portion of the rod to form an axle 13 for a roll 14 which engages the ground when the attachment is in its operative position.

Clamping bars 10 and 11 are similar in construction and each is provided at one end with a V-shaped recess which cooperates with the recess in the other bar to receive the tie rod of the mower and while any suitable means may be provided to firmly secure the clamping bars to the tie rod, as shown in the drawings, a bolt 15 extending through lower bar 11 has one end threaded through an opening in bar 10 adjacent its recess and when bolt 15 is tightened, the clamping bars are securely attached to the tie rod. To maintain the clamping bars in substantially parallel alignment, clamping bar 10 is provided at its end opposite to the recess with an opening to receive a threaded adjustable stud 16 having a reduced portion which bears against the adjacent end of clamping bar 11.

By providing opposite V-shaped recesses at the adjacent ends of bars 10 and 11, it will be apparent that the clamping bars may be applied to tie rods of different diameters and that the metal forming the V-shaped recesses at the end of bar 10 will engage the tie rod at points 17 and 18 and that the metal forming the V-shaped recess at the adjacent end of clamp 11 will engage the tie rod at points 19 and 20. By my improved arrangement, it will also be noted that the clamping bars extend substantially flush with the outer arcuate surface of the tie rod and consequently there is no danger of the cutting blades striking the clamping bars even though the clamping bars are attached to a tie rod that extends substantially axial to the hub of the wheel to form the axle upon which the wheels rotate. Although in the drawing the tie rod is shown arranged axial to the wheels, it will of course be understood that my improved attachment may be secured to the tie rod of lawn mowers of the type in which the tie rod is connected to opposite frames of the mower and is arranged adjacent the front of the mower.

As illustrated in Fig. 1 of the drawings, the clamping bar is attached to the tie rod adjacent one of the wheels 1 so that when the roll 14 engages the ground adjacent the edge of the lawn the wheel which would ordinarily ride in the recess 22 adjacent the edge of the lawn will be maintained in an elevated position, thus enabling the mower to cut the grass at the edge of the lawn without digging into the lawn.

In accordance with my invention, means are provided to firmly hold the roll 14 in engagement with the ground when it is desired to mow the edge of the lawn and to maintain the roll out of engagement with the lawn when both wheels engage the lawn. For this purpose, each of the clamping bars is provided with a longitudinally extending open slot 23 which slots are enlarged midway between their ends to form an opening 24 to receive a rod 12 and the lower bar 11 is provided with a transverse groove 25 arranged perpendicular to its longitudinally extending slot which receives a pin 26 extending through a transverse opening in rod 12, thus preventing upward and angular movement of roll 14 relative to clamping bar 11. When the roll is in its operative position, downward movement of the roll is prevented by the surface on which roll 14 rides and also by a thumb screw 27 which extends through clamping bar 10 and engages rod 12.

Figures 2, 3:
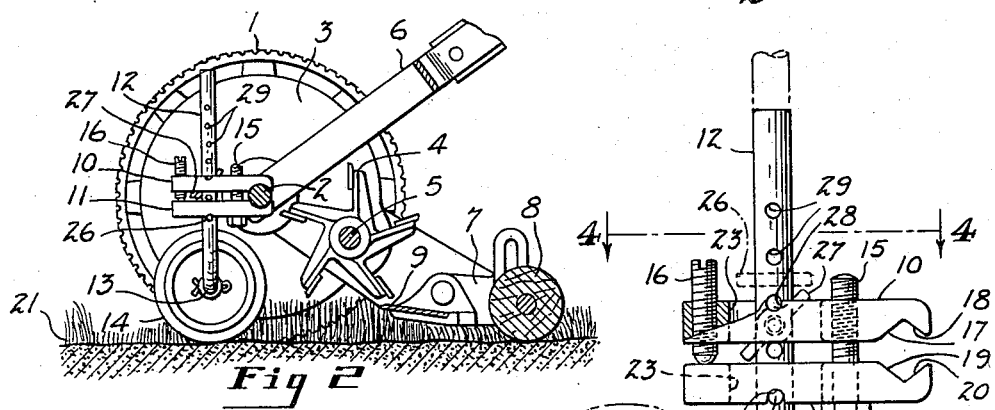
Fig. 2 is a cross sectional view on the line 2—2 of Fig. 1, showing parts in elevation.
Fig. 3 is a detail view of my improved attachment, showing parts in section, with the roll shown in its operative position in full lines and in a position in which it is being adjusted to an inoperative position in dotted lines.
Figure 4:
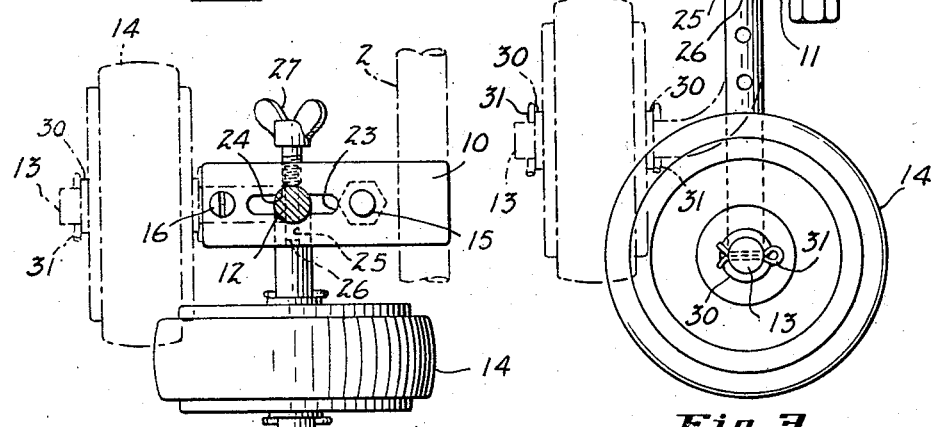
Fig. 4 is a plan view on the line 4—4 of Fig. 3.

This arrangement also permits the roll to be elevated from the ground and maintained adjacent one of the side wheels of the mower during the usual operation of the mower when both wheels ride upon the lawn. To elevate roll 14, thumb screw 27 is loosened and rod 12 is lowered sufficiently to remove pin 26 from groove 25. Rod 12 is then rotated through an arc of 90° to the dotted line positions shown in Figs. 3 and 4 at which time pin 26 is in alignment with the open slots 23 in clamping bars 10 and 11, thus enabling rod 12 and roll 14 to be elevated from their lower positions. Rod 12 is then rotated through an additional 90° arc to position roll 14 adjacent one of the wheels in which position it will not interfere with the usual operation of the mower.

To maintain roll 14 in its upper position, the upper clamping bar is also provided with a groove 28 arranged transversely to its open slot 23 and parallel to transverse groove 25 in which pin 26 may be positioned, thus preventing downward and angular movement of rod 12 and roll 14. At this time, upward movement of rod 12 may be prevented by tightening thumb screw 27. In adjusting roll 14 from its operative to its inoperative positions, it will be noted that loosening and tightening of the thumb screw is substantially all the mechanical operation that is required and consequently my improved attachment may be easily adjusted by women, boys, or unskilled workmen.

To enable my improved attachment to be applied to lawn mowers of various types in which the distance from the tie rod from the ground may vary, rod 12 is provided with a plurality of spaced openings 20 of equal sizes so that when the attachment is secured to a particular lawn mower, pin 26 may be positioned in the desired opening. Pin 26 and openings 29 are so constructed that pin 26 may be easily inserted in one of the openings 29. For instance, the openings 29 may be threaded to receive a threaded pin 26, or pin 26 may be slightly tapered at one or both ends so that it may be easily driven in and removed from one of the openings 29.

Roll 14 may be secured to axle 13 in any desired manner. As illustrated the wheel is interposed between washers 30 which are held in place by suitable means, such as cotter pins 31 extending through axle 13.

What I claim is:

1. In a lawn mower provided with a tie rod, an attachment for said lawn mower comprising a pair of horizontally disposed clamping bars arranged in superimposed relation and extending in the same direction from said tie rod, each of said bars having a recess therein adjacent one of its ends which recesses are arranged in opposed relation and which cooperate to receive said tie rod, means for adjustably forcing said clamping bars into engagement with said tie rod, each of said clamping bars having an opening intermediate its ends which is in alignment with the opening in the other clamping bar, an adjustable supporting rod extending through said aligned openings and having a roll at its lower end which roll engages the ground when said rod is in one position, and adjustable means extending through one of said clamping bars for engaging and holding said rod in each of its adjusted positions.

2. In a lawn mower provided with a tie rod, an attachment for said lawn mower comprising a pair of horizontally disposed clamping bars arranged in superimposed relation and extending in the same direction from said tie rod, each of said bars having a recess therein adjacent one of its ends which recesses are arranged in opposed relation and which cooperate to receive said tie rod, means arranged adjacent the opposed recesses for adjustably forcing said clamping bars into engagement with said tie rod, means extending through one of the clamping bars adjacent the end remote from said tie rod and engaging the other clamping bar for maintaining the free ends of said clamping bars in spaced relation, each of said clamping bars having an opening intermediate its ends which is in alignment with the opening in the other clamping bar, an adjustable supporting rod extending through said aligned slots and having a roll at its lower end which roll engages the ground when said rod is in one position, and adjustable means extending through one of said clamping bars for engaging and holding said rod in each of its adjusted positions.

3. In a lawn mower provided with a tie rod and cutter blades, an attachment for said lawn mower comprising a pair of horizontally disposed clamping bars arranged in superimposed relation and extending in the same direction from said tie rod, each of said bars having a V-shaped recess adjacent one end which cooperates with the substantially V-shaped recess at the adjacent end of the opposite clamping bar to receive tie rods of different diameters, each of said recesses being so arranged in its respective clamping bar that the adjacent fixed ends of said clamping bars terminate substantially flush with a portion of said tie rod to permit the outer edges of the cutter blades of said mower to rotate adjacent to the tie rod without striking the ends of the clamping bars, adjustable means adjacent said recesses for forcing the clamping bars in engagement with said tie rod, adjustable means extending through one clamping bar adjacent its free end and engaging the other clamping bar for maintaining the free ends of said clamping bars in spaced relation to each other, each of said clamping bars having an opening intermediate its ends which is in alignment with the opening in the other clamping bar, an adjustable supporting rod extending through said aligned slots and having a roll at its lower end which roll engages the ground when said rod is in its lower position, and adjustable means extending through one of said clamping bars for engaging and holding said rod in each of its adjusted positions.

4. In a lawn mower having a tie rod, an attachment for said lawn mower comprising a pair of longitudinally disposed clamping bars arranged in superimposed relation and extending in the same direction from said tie rod, each of said bars having a recess therein adjacent one of its ends which recesses are arranged in opposed relation and which cooperate to receive said tie rod, means for adjustably forcing said clamping bars into engagement with said tie rod, each of said clamping bars having a longitudinally extending open slot intermediate its ends which is in alignment with the open slot in the other clamping bar and the lower clamping bar being provided on its exposed lower surface with a transverse groove arranged intermediate the ends of its longitudinally extending slot, an adjustable supporting rod extending through said aligned slots which rod is provided with a transverse opening, said supporting rod having a roll at its lower end which roll engages the ground when said rod is in its lower position, and means for preventing upward and angular displacement of said roll including a pin extending through the transverse opening in said rod and having its opposite ends resting in the transverse groove in the lower clamping bar.

5. In a lawn mower provided with a tie rod, an attachment for said lawn mower comprising a pair of horizontally disposed clamping bars arranged in superimposed relation and extending in the same direction from said tie rod, each of said bars having a recess therein adjacent one of its ends which recesses are arranged in opposed relation and which cooperate to receive said tie rod, each of said clamping bars having a longitudinally extending open slot intermediate its ends which is in alignment with the open slot in the other clamping bar and the lower clamping bar being provided on its exposed lower surface with a groove extending transversely of its longitudinally extending slot, a supporting rod extending through said aligned slots which rod is provided with a plurality of transverse openings, said rod having a roll at its lower end which roll engages the ground when said rod is in its lower position, and means for preventing upward and angular displacement of said roll including a pin extending through one of the transverse openings in said rod with its opposite ends resting in the transverse groove in the lower clamping bar, and the transverse opening in said supporting rod through which said pin is extended being dependent upon the distance of the tie rod of said mower from the ground.

6. In a lawn mower provided with a tie rod, an attachment for said lawn mower comprising a pair of horizontally disposed clamping bars arranged in superimposed relation and extending in the same direction from said tie rod, each of said bars having a recess therein adjacent one of its ends which recesses are arranged in opposed relation and which cooperate to receive said tie rod, means for forcing said clamping bars into engagement with said rod, and each of said clamping bars being provided with a longitudinally extending open slot having an enlarged central opening arranged in alignment with the slot and opening in the other bar, said upper clamping bar being provided with a groove on its upper face extending transversely of its longitudinally extending slot and the lower clamping bar being provided with a groove on its lower face which extends transversely to its longitudinally extending slot, an adjustable supporting rod extending through the central openings in said bars and being movable from higher to lower positions, said supporting rod being provided with a transverse opening, a roll attached to the lower end of said rod which engages the ground when said rod is in its lower position, means for preventing upward and angular displacement of said supporting rod and roll when the supporting rod is in its lower position including a pin extending through the transverse opening in said supporting rod with its opposite ends seated in the transverse groove in the lower clamping bar, said supporting rod being rotatable in the slots in said bars when the supporting rod is lowered sufficiently to remove said pin from the groove in the lower bar to align the longitudinal axis of said pin with the longitudinally extending slots in said bars, thereby permitting said rod and pin to be moved through the slots in said bars and said pin to be again turned and received in the transverse groove in the upper bar to maintain said roll out of engagement with the ground.

7. In a lawn mower provided with a tie rod, an attachment for said lawn mower comprising a pair of clamping bars arranged in superimposed relation and extending in the same direction from said tie rod, each of said bars having a recess therein adjacent one of its ends which recesses are arranged in opposed relation and cooperate to receive said tie rod, means for forcing said clamping bars into engagement with said rod and each of said clamping bars being provided with a longitudinally extending open slot having an enlarged central opening which slot and central opening are arranged in alignment with the slot and the central opening in the other bar, said upper clamping bar being provided with a groove on its upper face extending transversely to its longitudinally extending groove and the lower clamping bar having a groove in its lower face which extends transversely to its longitudinally extending slot, an adjustable supporting rod extending through the aligned openings in said bars and being movable from higher to lower positions and having its lower end bent at an angle to its longitudinal axis which extends away from one of the wheels of said mower when the rod is in its lower position and said supporting rod being provided with an opening, a roll mounted on said angular portion which engages the ground when said supporting rod is in its lower position, means for preventing upward and angular displacement of said roll including a pin extending through the opening in said supporting rod with its opposite ends resting in the transverse groove in the lower clamping bar, said rod being rotatable through an arc of 90° when said pin is lowered out of position in the transverse groove in the lower bar to align said pin with the open longitudinally extending slot in said bars and being movable upwardly to a position in which said roll is elevated from the ground and in which position it may be again rotated through an additional arc of 90° to position said roll toward one of the wheels of said mower and said pin in the transverse groove in the upper clamping bar to prevent downward and angular movement of said roll.

DAVID R. POWELL.

REFERENCES CITED

The following references are of record in the file of this patent:

UNITED STATES PATENTS

| Number | Name | Date |
| --- | --- | --- |
| 365,558 | White | June 28, 1887 |
| 515,320 | Brenner | Feb. 27, 1894 |
| 1,006,807 | Tulane | Oct. 24, 1911 |

FOREIGN PATENTS

| Number | Country | Date |
| --- | --- | --- |
| 12,367 | Great Britain | June 9, 1908 |